United States Patent [19]

Tanaka

[11] Patent Number: 5,416,151
[45] Date of Patent: May 16, 1995

[54] POLYMER COMPOSITION AND ITS USE

[75] Inventor: Haruhiko Tanaka, Yamaguchi, Japan

[73] Assignee: Mitsui Petrochemical Industries, Ltd., Tokyo, Japan

[21] Appl. No.: 123,201

[22] Filed: Sep. 20, 1993

Related U.S. Application Data

[63] Continuation of Ser. No. 942,058, Sep. 8, 1992, abandoned, which is a continuation of Ser. No. 759,920, Sep. 13, 1991, abandoned.

[30] Foreign Application Priority Data

Sep. 14, 1990 [JP] Japan .................................. 2-245009

[51] Int. Cl.⁶ ............................ C08K 5/01; B32B 3/00
[52] U.S. Cl. .................... 524/484; 524/271; 524/425; 524/485; 524/486; 524/490; 524/491; 524/528; 524/579; 428/95; 428/97
[58] Field of Search ............... 524/484, 485, 486, 490, 524/491, 528, 579, 271, 425; 428/95, 97

[56] References Cited

U.S. PATENT DOCUMENTS

| | | | |
|---|---|---|---|
| 3,440,208 | 4/1969 | Foglia et al. | 524/528 |
| 3,455,871 | 7/1969 | Coover et al. | 524/528 |
| 3,551,194 | 12/1970 | Sheperd et al. | 524/579 |
| 4,288,358 | 9/1981 | Trotter et al. | 524/579 |
| 4,443,575 | 4/1984 | Iwai et al. | 428/97 |
| 4,508,771 | 4/1985 | Peoples, Jr. et al. | 428/95 |
| 4,588,794 | 5/1986 | Oda et al. | 525/332.1 |
| 4,624,983 | 11/1986 | Jarzember et al. | 524/579 |
| 4,752,634 | 6/1988 | Goss | 524/487 |
| 4,761,450 | 8/1988 | Lakshmanan et al. | 524/528 |
| 4,833,192 | 5/1989 | Lakshmanan et al. | 524/490 |

FOREIGN PATENT DOCUMENTS 0046536 3/1982 European Pat. Off. ............ 524/579
2265815 10/1985 France .
1492703 11/1977 Germany .

Primary Examiner—Paul R. Michl
Assistant Examiner—Olga Asinovsky
Attorney, Agent, or Firm—Sherman and Shalloway

[57] ABSTRACT

A polymer composition substantially comprising
(A) 5 to 40 weight parts of a 1-butenic polymer,
(B) 95 to 60 weight parts of an inorganic filler,
(C) a hydrocarbonic oil in an amount of 2 to 20 weight parts per 100 weight parts in total of the above (A) and (B), and
(D) a thermoplastic resin other than 1-butenic polymers in an amount of 0 to 20 weight parts per 100 weight parts in total of the above (A) and (B).

17 Claims, No Drawings

POLYMER COMPOSITION AND ITS USE

This application is a continuation of application Ser. No. 07/942,058, filed Sep. 8, 1992, now abandoned, which is a continuation of application Ser. No. 07/759,920, filed Sep. 13, 1991, now abandoned.

INDUSTRIALLY APPLICABLE FIELD

This invention relates to a polymer composition containing a poly 1-butene resin as a resin component and its use. More detailedly, this invention relates to a polybutene-1 polymer composition containing a large amount of a filler, which composition is excellent in flexibility and dimensional stability and does not generate poisonous gas if it burns, and a sheet made of the composition. This invention further relates to a flexible sheet suitable, for example as a backing material for carpets, etc.

PRIOR ART

In recent years, carpets often have been used in offices, homes, etc. However, since usual carpets are wide in width and length, they had drawbacks, for example, that they are poor in storability, workability, etc. and, when they are partly stained or scorched, it is hard to repair the part alone. Thus, tile type carpets having a width on the order of 30 to 50 cm were developed. These tile type carpets have various advantages, for example, that they are easy even for non-professionals to install, they can easily be stored and repaired, and moreover, it is also possible to give a preferred design by changing the arrangement of tile type carpets having different colors and designs.

These tile type carpets are at least required to possesses the characteristics of the following to .

To have proper weight and flexibility

It is necessary for the carpets to exhibit smoothness even when installed on a floor surface having some unevenness without using an adhesive or the like. Thus, it is necessary for them to have proper weight and flexibility, whereby it is prevented that smoothness is impaired, for example due to partial rise.

Dimensional stability

The temperature of carpets changes over a fairly wide range of from about $-5°$ C. up to about $40°$ C. depending on the seasons of winter and summer. When tile type carpets have a large linear expansion coefficient, there arise, due to temperature change over such a fairly wide range, inconveniences, for example that gaps arise from the contraction of the carpets at the low temperature time of winter, whereas at the high temperature time of summer they partly rise; and therefore desirably they have a small linear expansion coefficient.

Not to generate poisonous gas at the time of combustion

In recent years, there is a tendency that many of the causes of death in fires, particularly fires at houses, offices, department stores, etc. are poisoning death due to poisonous gas generated at the time of combustion. Thus, although it is required for the fiber as the body of a carpet to be flame retardant or not to generate poisonous gas even by combustion, a similar property is also required on the backing material itself.

Polyvinyl chloride sheets containing calcium carbonate in a high concentration which have hitherto been used as a backing material of carpets can satisfy the above characteristics and , but are insufficient in the point of the above because they generate chlorine gas or hydrogen chloride gas upon combustion. Therefore, materials are demanded which do not generate poisonous gas by combustion.

On the other hand, 1-butenic polymers are known to be resins capable of containing a large amount of a filler, and it is proposed that 1-butenic polymer compositions containing a large amount of a filler can be used, for example as laminates of magnetic tapes, plastic porcelains, floor covering materials or wall covering materials (Refer to Japanese Laid-Open Patent Publication No. 31550/1985).

Further, a composition essentially consisting of (a) 5 to 50 weight % of an ethylene-containing copolymer, (b) 2 to 15 weight % of a process oil and 50 to 90 weight % of a filler is proposed, and this composition is proposed to be utilized for sound deadening sheet, carpets having back coacting, particularly automotive carpets (Refer to Japanese Laid-Open Patent Publication No. 71734/1980 and U.S. Pat. No. 4,263,196).

PROBLEMS TO BE SLOVED BY THE INVENTION

However, when a sheet made of a usual 1-butenic polymer composition containing a large amount of a filler was used as a backing material of carpets, it was still insufficient, in flexibility and had a large linear expansion coefficient and thus was insufficient in dimensional stability against temperature change. Further, such a composition contained a large amount of an inorganic filler, and was thus low in fluidity at the time of melting and also had a problem in moldability.

Thus, the object of this invention lies in providing a poly(1-butene) resin composition containing a large amount of a filler which is excellent in moldability, flexibility and dimensional stability, and suitable as a raw material of flexible sheets which do not generate poisonous gas by combuston; and a sheet made of it.

Another object of this invention lies in providing a tile type carpet having excellent characteristics hereinabove described.

MEANS FOR SOLVING THE PROBLEMS

According to research by the present inventors, it has been found that the objects and advantages of this invention can be accomplished by a polymer composition substantialy comprising (A) 5 to 40 weight parts of a 1-butenic polymer,
(B) 95 to 60 weight parts of an inorganic filler,
(C) a hydrocarbonic oil in an amount of 2 to 20 weight parts per 100 weight parts in total of the above (A) and (B), and
(D) a thermoplastic resin other than 1-butenic polymers in an amount of 0 to 20 weight parts per 100 weight parts in total of the above (A) and (B).

The polymer composition of the invention and a sheet made of it are detailedly described below.

The 1-butenic polymer (A) as a polymer component of the compositon of the invention is a homopolymer of 1-butene or a copolymer of 1-butene with another α-olefin having 2 to 20 carbon atoms. Other examples of α-olefins having 2 to 20 carbon atoms include, for example, ethylene, propylene, 4-methyl-1-pentene, 1-hexene, 1-octene, 1-decene, 1-tetradecene, 1-octadecene, etc. One or two or more of these other α-olefins can be contained in the 1-butenic polymer (A) in a copolymerized form.

Further, when the 1-butenic polymer (A) contains another olefin in a copolymerized form, the content is usually 20 mole % or less, preferably 10 mole % or less.

The melt flow rate (MFR) of the 1-butenic polymer (A) is such that when the resulting composition is extrusion molded, melt extrusion becomes easy and moldability becomes good, and is 0.01 to 150 g/10 min, preferably 0.05 to 50 g/10 min.

This melt flow rate (MFR) is a value measured according to ASTM D 1238, E.

Further, the ratio (Mw/Mn) of weight average molecular weight (Mw) to number average molecular weight (Mn) denoting the molecular weight distribution of the 1-butenic polymer (A) is usually in the range of about 2 to about 15, and is preferably in the range of about 3 to about 8 in view of excellence in moldability and mechanical strength.

In case where the 1-butenic polymer (A) is a homopolymer, the isotactic index (I.I.) as an index of its stereoregularity is 80 % or more, and is preferably 90 % or more in view of excellence in dimensional stability.

This isotactic index (II) is an index measured, by the following method.

1 g of a 1-butenic polymer is dissolved in 100 ml of n-decane, the solution is cooled to 0° C. and left at 0° C. for 24 hours to deposit the highly stereoregular component, and the weight % of the insoluble part is used as the isotactic index (I.I.).

The polymer composition of the invention contains a large amount of the inorganic filler (B), as mentioned above. This inorganic filler (B) may be one usually used as a filler for various polymers and may be in a form of powder, flake, short fiber, whisker on the like. Further, the inorganic filler may be naturally produced or treated or artificially synthesized.

When the inorganic filler (B) is powder or flake, it is desirable that the average diameter is about 10 to about 1,000 micrometers preferably about 50 to about 500 micrometers. Further, when it is fibrous, it is suitable that it is short fiber having a length of about 7 mm or less, preferably about 5 mm or less.

Specific examples of the inorganic filler (B) are, for example, magnesium carbonate, calcium carbonate, clay, kaolin, bentonite, talc, silica, mica, diatom earth, quartz sand, pumice powder, slate powder, asbestos, alumina white, barium sulfate, lithopone, calcium sulfate, molybdenum disulfide, graphite, glass fiber, glass globes, foamed glass globes, fly ash, volcanic glass hollow bodies, synthesized inorganic hollow bodies, single-crystal potassium titanate, carbon black, carbon fiber, carbon hollow bodies, anthracite culm, artificial rock crystal; hydroxides of magnesium, calcium, etc.; vermiculite, graphite; metals such as iron, aluminum and zinc and their oxides; ferrite, etc. There are used solely or in a combination of two or more. Preferred among them are magnesium hydroxide, carbon black, ferrite, mica, talc and calcium carbonate all in the form of powder since they can afford a sheet having further excellent flexibility and smaller linear expansion coefficient.

The hydrocarbonic oil (C) in the polymer composition of the invention is liquid at ordinary temperature and may be either one that occurs in nature or synthesized one. Preferred ones among the hydrocarbonic oils (C) are those having compatibility with the 1-butenic polymer, and particularly those having a kinematic viscosity of 30 to 600 cSt (centistokes) at 40° C. Specific examples of the hydrocarbonic oil (C) are, for example, oils comprising paraffinic, naphthenic or aromatic hydrocarbons and mineral oils which are a mixture of the above hydrocarbons; co-oligmers of ethylene and an alpha olefin; liquid polybutene, and squalane. These are used alone or in a combination of two or more. Preferred among them are paraffinic process oils and liquid polybutene.

The ratio of the above component (B) to the component (A) contained in the polymer composition of the invention is a ratio of 95 to 60 weight parts, preferably 93 to 70 weight parts of the inorganic filler (B) to 5 to 40 weight parts, preferably 7 to 30 weight parts of the 1-butenic polymer (A) in view of the balance of flexibility and linear expansion coefficient.

Further, the ratio of the hydrocarbonic oil (C) contained in the polymer composition of the invention is 2 to 20 weight parts, preferably 5 to 15 weight parts per 100 weight parts in total of the 1-butenic polymer (A) and the inorganic filler (B) in view of giving good extrusion moldability and flexibility and causing no inconvenience, for example that the oil bleeds on the resin surface.

Further, the polymer composition of the invention can also contain, in a range such that the object of the invention is not spoiled, a thermoplastic resin (D) other than 1-butenic polymers such as polyethylene, polypropylene, polystyrene or an olefinic elastomer, aiming at the improvement of moldability or the adjustment of various physical properties. When the polymer composition of the invention contains such a thermoplastic resin (D), its content are usually in a range of 0 to 20 weight parts per 100 weight parts in total of the 1-butenic polymer (A) and the inorganic filler (B).

Still further, the polymer composition of the invention can contain, if necessary, in a range such that the object of the invention is not spoiled, additives such as an antioxidant, an ultraviolet absorber, a fungicide, a rust inhibitor, a lubricant, a filler, a pigment and a heat resistant stabilizer.

As for the preparation of the polymer composition of the invention, a granular or pelletized polymer composition can be obtained, for example by mixing the 1-butenic polymer (A), the inorganic filler (B) the hydrocarbonic oil (C) and the thermoplastic resin (D), and if necessary, the above various additives in a conventional mixer such as a Henschel mixer, and melting and kneading the mixture using an extruder.

According to the invention, there is provided a sheet made of the above polymer composition and a carpet wherein such a sheet is used as a backing material. The thickness of the sheet is 1 to 5 mm, preferably 2 to 3 mm.

The sheet can be molded from the polymer composition according to a method known per se. For example, the molding can be carried out according to a conventional method such as, for example, extrusion molding, injection molding or press molding. In case of the preparation of a carpet, the carpet is prepared by a method wherein a sheet having a thickness of about 1 to 3 mm is continuously molded by extrusion molding and at the same time laminated with a carpet.

The polymer composition and a sheet made thereof according to the invention can suitably be used not only as a backing material for carpets, but as a tube material for feed water and drain, a covering material for electric bulbs, and the like.

EXAMPLES

This invention is specifically described below according to examples and comparative examples.

In the examples and comparative examples, the tensile Young's modulus (kg/cm$^2$) and linear expansion coefficient ($10^5$/°C.) of the sheets were measured according to the following methods. Further, the bending test was carried out according to the following method.

Tensile Young's Modulus

The measurement was made according to JIS K 7113.

Tensile Young's modulus is a value used as an index of the rigidity of a sheet, and when this value is high, the sheet is hard, and when the value is low, the sheet is soft. When tensile Young's modulus is 5,000 kg/cm$^2$ or more, the sheet is inferior in flexibility and unsuitable as a backing material for carpets.

Linear Expansion Coefficient

The measurement was made using a thermomechanically analyzing apparatus (produced by Seiko Denshi Kogyo Co., Ltd., TMA 100).

The smaller is the linear expansion coefficient, the better is the dimensional stability of the carpet tile, and desirably, the linear expansion coefficient is $15 \times 10^{-5}$ (1/°C.) or less.

Bending Test

The brittleness of a sheet 3 cm wide, 20 cm long and 3 mm thick was investigated by bending it by hand.

It is undesirable to form crazing or crack easily by bending since the carpet will break at the time of the installation of it.

Examples 1 to 14 and Comparative Examples 1 to 5

The 1-butenic polymer (A), the inorganic filler (B) and the hydrocarbonic oil (C) were mixed in the compounding ratio shown in Table 1 by a Henschel mixer, melted and kneaded at a molding temperature of 200° C. using a biaxial extruder, and molded into a sheet having a thickness of about 3 mm by the press molding method. According to the above methods, the resulting sheet was measured for tensile Young's modulus and linear expansion coefficient, and further subjected to the bending test to judge the brittleness of the sheet. The results are shown in Table 1.

TABLE 1

| | Composition | | | | | | Physical property of the composition | | | |
| --- | --- | --- | --- | --- | --- | --- | --- | --- | --- | --- |
| | 1-Butenic polymer | weight part | Inorganic filler | weight part | Hydrocarbonic oil | weight part | Tensile Young's modulus Kg/cm$^2$ | Presence of the formation of crack at the time of bending | Linear expansion coefficient 10$^{-5}$/°C. | Judgment |
| Example 1 | Polybutene homopolymer MFR = 0.5 I.I. = 95% | 20 | CaCO$_3$ | 80 | Paraffinic process oil | 10 | 2200 | No | 8.9 | Usable |
| Example 2 | Polybutene homopolymer MFR = 0.5 I.I. = 95% | 20 | CaCO$_3$ | 80 | Paraffinic process oil | 15 | 1400 | No | 9.0 | Usable |
| Example 3 | Polybutene homopolymer MFR = 0.5 I.I. = 95% | 15 | CaCO$_3$ | 85 | Paraffinic process oil | 15 | 1350 | Fine cracks were formed | 7.7 | Usable |
| Example 4 | Polybutene homopolymer MFR = 0.5 I.I. = 95% | 10 | CaCO$_3$ | 90 | Paraffinic process oil | 15 | 1600 | Fine cracks were formed | 5.8 | Usable |
| Example 5 | Polybutene homopolymer MFR = 0.5 I.I. = 95% | 30 | CaCO$_3$ | 70 | Paraffinic process oil | 10 | 2600 | No | 8.6 | Usable |
| Example 6 | Polybutene homopolymer MFR = 0.5 I.I. = 95% | 40 | CaCO$_3$ | 60 | Paraffinic process oil | 10 | 1400 | No | 11.2 | Usable |
| Example 7 | Butene ethylene copolymer (MFR = 1 ethylene = 2 mol %) | 20 | CaCO$_3$ | 80 | Paraffinic process oil | 5 | 3200 | No | 7.2 | Usable |
| Example 8 | Butene ethylene copolymer (MFR = 1 ethylene = 2 mol %) | 20 | CaCO$_3$ | 80 | Paraffinic process oil | 10 | 1600 | No | 9.0 | Usable |
| Example 9 | Butene ethylene copolymer (MFR = 1 ethylene = 2 mol %) | 20 | CaCO$_3$ | 80 | Paraffinic process oil | 15 | 850 | No | 9.5 | Usable |
| Example 10 | Butene propylene copolymer (MI = 3 propylene = 10 mol %) | 20 | CaCO$_3$ | 80 | Paraffinic process oil | 10 | 1800 | No | 8.7 | Usable |
| Example 11 | Butene hexane copolymer (MFR = 2 hexene = 7 mol %) | 20 | CaCO$_3$ | 80 | Paraffinic process oil | 10 | 1400 | No | 9.2 | Usable |
| Example 12 | Butene 4-methyl-1-pentene copolymer (MFR = 5 4-methyl-1-pentene = 12 mol %) | 20 | CaCO$_3$ | 80 | Paraffinic process oil | 5 | 1300 | No | 9.2 | Usable |
| Example 13 | Polybutene homopolymer (MFR = 0.5) I.I. = 95% | 20 | CaCO$_3$ | 80 | ethylene-olefinic synthesized oil | 10 | 1800 | No | 8.8 | Usable |
| Example 14 | Polybutene homopolymer | 20 | Talc | 80 | Paraffinic process oil | 10 | 2000 | No | 8.6 | Usable |

TABLE 1-continued

|  | Composition | | | | | | Physical property of the composition | | | |
|---|---|---|---|---|---|---|---|---|---|---|
|  | 1-Butenic polymer | weight part | Inorganic filler | weight part | Hydrocarbonic oil | weight part | Tensile Young's modulus Kg/cm² | Presence of the formation of crack at the time of bending | Linear expansion coefficient 10⁻⁵/°C. | Judgment |
| Example 15 | (MFR = 1) I.I. = 95% polybutene homopolymer | 20 | CaCO₃ | 80 | Liquid polybutene | 15 | 920 | No | 11.5 | Usable |
| Example 16 | (MFR = 0.5) I.I. = 95% Butene ethylene copolymer (MFR = 1 ethylene = 2 mol %) | 20 | CaCO₃ | 80 | Liquid polybutene | 15 | 750 | No | 13.2 | Usable |
| Comparative Example 1 | Polybutene homopolymer (MFR = 0.5) I.I. = 95% | 20 | CaCO₃ | 80 | — |  | 20000 | Cracks mere formed | 5.8 | poor in flexibility and unusable |
| Comparative Example 2 | Polybutene homopolymer (MFR = 0.5) I.I. = 95% | 40 | CaCO₃ | 60 | — |  | 11000 | No | 11.0 | Poor in flexibility and unusable |
| Comparative Example 3 | Butane ethylene copolymer (MFR = 1 ethylene = 2 mol %) | 40 | CaCO₃ | 60 | — |  | 8000 | No | 12.8 | Poor in flexibility and unusable |
| Comparative Example 4 | Ethylene propylene copolymer (MFR = 4 C₃ = 20 mol %) | 40 | Talc | 60 | — |  | 200 | No | 32.0 | Dimensional change is large, unusable |
| Comparative Example 1 | Ethylene-vinyl acetate copolymer (MFR = 5 VA = 25%) |  | CaCO₃ | 60 | — |  | 1200 | No | 21.0 | Dimensional change is large, unusable |

Note)
In the table, "PW-380" produced by Idemitsu Kosan Co., Ltd. was used as the paraffinic process oil. The average molecular weight thereof was 746, and its kinematic viscosity was 381.6 cSt. "LV-100" produced by NIPPON OIL COMPANY LIMITED was used as the liquid polybutene. The average molecular weight thereof was 570, and its kinematic viscosity was 220 cSt.

The polymer composition according to this invention is excellent particularly in flexibility and dimensional stability, and suitable as a material of flexible sheets which do not generate poisonous gas even if they are burned. Further, the sheet of the invention made of this polymer composition has such excellent characteristics as above and is particularly suitable as a backing material for tile type carpets.

I claim:

1. A polymer composition consisting essentially of:
   (A) 5 to 30 weight parts of a 1-butenic polymer having a melt flow rate of 0.01 to 150 g/10 minutes, said 1-butenic polymer being a homopolymer of 1-butene or a copolymer of 1-butene with 20 mol % or less of another α-olefin,
   (B) 95 to 70 weight parts of an inorganic filler, and
   (C) a hydrocarbonic oil in an amount of 2 to 20 weight parts per 100 weight parts in total of the above (A) and (B), wherein said hydrocarbonic oil is selected from the group consisting of paraffinic, naphthenic and aromatic hydrocarbons, co-oligomers of ethylene and alpha-olefin, squalane and mixtures thereof;
   said composition when formed into a sheet having a Young's modulus in the range of from about 750 kg/cm² to about 5,000 kg/cm².

2. The polymer composition of claim 1 wherein the ratio of the 1-butenic polymer (A) to the inorganic filler (B) is in a range of 7:93 to 30:70 by weight.

3. The polymer composition of claim 1 wherein the hydrocarbonic oil (C) is contained in an amount of 5 to 15 weight parts per 100 weight parts in total of the above (A) and (B).

4. The polymer composition of claim 1 wherein the inorganic filler (B) is a powder, flake or short fiber.

5. The polymer composition of claim 1 wherein the inorganic filler (B) is at least one member selected from the group consisting of magnesium hydroxide, carbon black, ferrite, mica, talc and calcium carbonate all in the form of powder.

6. The polymer composition of claim 1 wherein the hydrocarbonic oil (C) is liquid at normal temperature and has a kinematic viscosity of 30 to 600 cSt at 40° C.

7. The polymer composition of claim 1 wherein the hydrocarbonic oil (C) is a paraffinic process oil.

8. A sheet comprising the polymer composition of claim 1.

9. In a method for making a carpet comprising a backing on the underside of the carpet, the improvement comprising laminating the underside of the carpet with a sheet to form said backing of the carpet wherein the sheet comprises a polymer composition consisting essentially of
   (A) 5 to 40 weight parts of a 1-butenic polymer having a melt flow rate of 0.01 to 150 g/10 minutes, said 1-butenic polymer being a homopolymer of 1-butene or a copolymer of 1-butene with 20 mol % or less of another α-olefin,
   (B) 95 to 60 weight parts of an inorganic filler, and (C) a hydrocarbon oil in an amount of 2 to 20 weight parts per 100 weight parts in total of the above (A) and (B), wherein said hydrocarbon oil is selected from the group consisting of paraffinic, naphthenic and aromatic hydrocarbons, co-oligomers of ethylene and alpha-olefin, squalane and mixtures thereof and continuously molding the sheet by extrusion molding and simultaneously laminating the molded sheet with the carpet material; said sheet having a Young's modulus in the range of from about 750 kg/cm$^2$ to about 5,000 kg/cm$^2$.

10. The method of making a carpet according to claim 9 wherein the sheet has a thickness of from 1 to 3 mm.

11. The sheet of claim 8 wherein the sheet has a thickness of from 2 to 3 mm.

12. In a carpet comprising a backing material on the underside of the carpet, the improvement comprising as said backing the sheet according to claim 8 which has been continuously molded by extrusion molding and simultaneously laminated with the carpet to form the backing of the carpet.

13. The polymer composition of claim 1 wherein the 1-butenic polymer is a homopolymer of 1-butene.

14. The polymer composition of claim 1 wherein the 1-butenic polymer is a copolymer of 1-butene with up to 10 mol % of another α-olefin.

15. The polymer composition of claim 1 wherein the 1-butenic polymer has a melt flow rate of from 0.05 to 50 g/10 minutes.

16. The polymer composition of claim 1 wherein the 1-butene homopolymer has an isotactic index, as an index of its stereoregularity, of at least 80%.

17. The polymer composition of claim 1 wherein the 1-butenic polymer has a molecular weight distribution Mw/Mn in the range of from about 3 to about 8.

* * * * *